(12) United States Patent
Takahashi

(10) Patent No.: US 6,795,122 B2
(45) Date of Patent: Sep. 21, 2004

(54) FOCAL-PLANE SHUTTER FOR DIGITAL STILL CAMERAS

(75) Inventor: Shigemi Takahashi, Nerima-ku (JP)

(73) Assignee: Nidec Copal Corporation, Tokyo (JP)

( * ) Notice: Subject to any disclaimer, the term of this patent is extended or adjusted under 35 U.S.C. 154(b) by 391 days.

(21) Appl. No.: 09/902,690

(22) Filed: Jul. 12, 2001

(65) Prior Publication Data

US 2002/0006285 A1 Jan. 17, 2002

(30) Foreign Application Priority Data

Jul. 12, 2000 (JP) ........................................ 2000-215898
Nov. 27, 2000 (JP) ........................................ 2000-364548

(51) Int. Cl.[7] ........................ H04N 5/235; H04N 5/225; G03B 9/00; G03B 9/08
(52) U.S. Cl. ........................ 348/362; 348/374; 396/443; 396/456
(58) Field of Search ................................ 348/362, 363, 348/367, 374; 396/443, 456, 460, 461

(56) References Cited

U.S. PATENT DOCUMENTS

| | | | | |
|---|---|---|---|---|
| 4,290,682 A | * | 9/1981 | Saito et al. | 396/484 |
| 4,364,654 A | * | 12/1982 | Senuma et al. | 396/484 |
| 4,540,260 A | * | 9/1985 | Nakano | 396/489 |
| 5,012,271 A | * | 4/1991 | Nishimura et al. | 348/363 |
| 5,333,025 A | * | 7/1994 | Dowe | 396/469 |
| 6,000,860 A | * | 12/1999 | Krueger | 396/469 |
| 2001/0010560 A1 | * | 8/2001 | Takahashi | 348/367 |

FOREIGN PATENT DOCUMENTS

| | | | |
|---|---|---|---|
| JP | 09-133943 | 5/1997 | |
| JP | 11-194394 | * 7/1999 | ............ G03B/9/36 |
| JP | 11-218838 | 8/1999 | |
| JP | 11-261863 | 9/1999 | |
| JP | 11-326992 | * 11/1999 | |

* cited by examiner

Primary Examiner—Andrew Christensen
Assistant Examiner—Nhan Tran
(74) Attorney, Agent, or Firm—Pillsbury Winthrop LLP

(57) ABSTRACT

A focal-plane shutter for digital still cameras includes a first blade and a second blade, each having a plurality of arms and at least one blade component pivotally supported thereby; a driving member for the first blade, opening an exposure aperture through the first blade; a driving member for the second blade, closing the exposure aperture through the second blade; a retaining means for the first blade and a retaining means for the second blade, retaining individual driving members at positions where the exposure operation is started, immediately before the exposure operation is started, and releasing their retaining forces at preset timing when the exposure operation is started; and a cocking member for actuating the driving member for the second blade when moved from the initial position to the cocked position thereof, and actuating the driving member for the first blade in photography. Consequently, the amount of operation of each of the first blade and the second blade is minimized and a small-sized focal-plane shutter can be constructed.

12 Claims, 12 Drawing Sheets

FOCAL-PLANE SHUTTER FOR DIGITAL STILL CAMERAS

BACKGROUND OF THE INVENTION

1. Field of the Invention

This invention relates to a focal-plane shutter for digital still cameras which is designed to actuate a first blade and a second blade in turn in the same direction when photographing is performed and to expose an imaging surface through a slit provided by both blades.

2. Description of Related Art

In focal-plane shutters used in digital still cameras, some types of shutters are known in accordance with the specifications of cameras. One of them, like a focal-plane shutter used in a film camera, is equipped with a first blade and a second blade to actuate these blades in turn at predetermined timing so that an imaging surface is exposed continuously from its one side to the other through a slit provided by the blades.

Digital still cameras using shutters constructed as mentioned above are divided into two classes, those in which an optical finder is provided as in the film camera so that the imaging surface is covered by at least one of the first blade and the second blade, except for the case where photographing is performed, and those, having finders referred to as electronic view finders, in which the entire surface in an exposure aperture is exposed to light from an object so that an image of the object can be observed through a monitor, even when photographing is not performed. Thus, the latter camera is such that, in photography, the first blade is moved to the position where the imaging surface is covered, and then an exposure operation is performed.

In the film camera, the area of the imaging surface is usually larger than that of the digital still camera. The film camera always has the optical finder. Due to the arrangement of an optical system and the placement of a film, each of the first blade and the second blade is composed of a plurality of blade components to achieve compactness of a shutter unit. However, in the digital still camera, particularly provided with the electronic view finder, each of the first blade and the second blade need not necessarily be constructed with a plurality of blade components, and is also known to have a single blade component. An example of a shutter constructed from such a viewpoint is shown in FIG. 1 (refer to Japanese Patent Preliminary Publication No. Hei 11-326992).

Since the focal-plane shutter for digital still cameras mentioned above, in contrast with that for film cameras, is not subjected to severe restriction of space, each of the first blade and the second blade, as described above, can be constructed with a single blade component. However, if the entire shutter unit is enlarged, the number of degrees of design freedom of a camera will be limited in inverse proportion to shutter size, and the possibility of using this shutter unit will diminish. Thus, apart from the number of blade components of each of the first blade and the second blade to be constructed, at least, compactness of the entire shutter unit is the maximum requirement, together with cost reduction thereof.

When the conventional example shown in FIG. 1 is considered from such a standpoint, the shutter is constructed so that the vertical dimension of a base plate 101 must be essentially increased. Specifically, in FIG. 1, a second blade 105 is located at a higher position than a first blade 102, and when the exposure operation is performed, the second blade 105 passes the place of the first blade 102 and then blocks an optical path AP. Thus, the conventional example, in contrast with an ordinary shutter, unnecessarily provides a space for the second blade 105 and must increase the vertical dimension of the base plate 101 accordingly.

In the conventional example mentioned above, even though each of the first blade 102 and the second blade 105 is constructed with a plurality of blade components, it is impossible to obtain further compactness of the shutter unit. Specifically, for example, if the first blade 102 and the second blade 105 are constructed with respective two blade components and are arranged as in FIG. 1 in a state where the respective two blade components are completely superimposed, the dimension above the optical path AP will be approximately halved. In this case, however, the two blade components of the first blade, after blocking the optical path AP in a state where the amount of mutual superposition is minimized, are moved downward by the same amount as in this state, and thus the dimension below the optical path AP is required twice. As a result, the upper and lower dimensions of the base plate 101 unit cannot be reduced.

In particular, when the focal-plane shutter is used, it is necessary to actuate each of the shutter blades at a high speed in photography. Thus, it is common practice to use a spring as a driving source of the shutter blade. However, when the shutter blade is restored to a state before photography against the biasing force of the spring, it is common practice to use a motor as a driving source of the shutter blade. In most cases, the exposure aperture is opened and closed by moving the shutter blades vertically in an ordinary photographing posture in which a camera is held by hands on both sides thereof.

A conventional digital camera using such a focal-plane shutter has been initially designed to follow the appearance of the film camera. However, in recent years, the low cost and high image quality of a CCD have been achieved, and the digital camera has exceeded the film camera in sales. As such, the design of appearance of the digital camera itself has been developed and as a result, peculiar compactness or downsizing of the internal structure of the camera has become necessary. Techniques for such compactness are disclosed, for examples, in Japanese Patent Preliminary Publication Nos. Hei 11-261863 and Hei 11-218838.

Specifically, in Hei 11-261863, as shown in FIGS. 1 and 2 of this publication, the internal area of the casing of the camera is partitioned by an image display circuit substrate 19, a partition plate 20, a first record compaction circuit substrate 21, and a first imaging circuit substrate 16, and is divided into a middle space 23A, a first side space 23B, and a second side space 23C so that electrical parts are arranged efficiently with respect to the function and radiation in each space. In a grip 5, parts of a record compaction circuit system are arranged. In particular, by this construction, a rise in temperature of an image sensor 8 caused by the convection of air can be prevented and at the same time, compactness of a casing 2 can be achieved.

In this case, compactness is also required for the shutter constituting the camera, and an example of this is set forth in Hei 11-218838. According to this example, in FIGS. 1, 2, and 6 of this publication, an imaging unit 73 is placed so that its one end on the side of a photographing lens 45 projects into a second aperture 63a of a frame 63 on the imaging unit side. Since a shutter blade 67a is placed on the side of the photographing lens 45, shutter blades 67a–67e are deflected by a shock produced when a shutter screen 65 is closed, but the shutter is designed so that the shutter blades do not come in contact with the imaging unit 73. A length along the optical path of the photographing lens can thus be reduced, and it is possible to achieve compactness of the camera.

As mentioned above, the camera of Hei 11-261863 is constructed so that the arrangements of parts of electric circuits are changed and thereby the size of the casing can be diminished. Even in this case, however, space surrounded by heavy dotted lines in FIGS. 1 and 2 of the publication still leaves room for compactness. The shutter unit is to be placed in this space, but if the shutter unit of Hei 11-218838 is used, it is conceivably possible to place this shutter unit in the space. It is an unquestionable fact, as described above, that the focal-plane shutter for digital still cameras in the future is subjected to restrictions from viewpoints different from those in the past and must be designed to meet the demand of compactness or downsizing accordingly.

The focal-plane shutter, as mentioned already, uses the spring as the driving source for actuating the shutter blade in photography and the motor as the driving source for restoring it to a state before photography. In a conventional focal-plane shutter, however, the motor is mounted on the camera body side, and thus when the shutter unit is incorporated in the camera body, both must be connected through wheels. The placement of such a transmission mechanism and the construction of a connection require a relatively wide space and high cost. However, the digital still camera, like the film camera, sometimes has no stop mechanism. Even though the camera is provided with the stop mechanism, there may be no need to have the motor in common. There may be no need to have the motor in common with a mirror drive, or a mirror mechanism itself may not be provided. As mentioned above, when there is no need to have the motor in common, it is the best way to mount the motor to the shutter unit.

Apart from the case where a costly and specially constructed motor is used, when a motor which has a long rotary shaft and is advantageous in cost is used as usual, the shutter unit cannot be favorably placed in the casing of the digital still camera if the motor is merely mounted to the shutter unit. Specifically, since the shutter unit must be designed so that it can be used in various digital still cameras as far as possible, it is necessary that, in addition to compactness of the shutter unit itself, the shutter unit is constructed so that, for example, the design of appearance of the camera is not restricted as far as possible; an electric part, such as a cell which requires a great volume, is placed without difficulty; and the placement of a mirror mechanism does not offer an obstruction. When these requirements are synthesized, it is required that the front-to-back dimension of the camera is reduced as far as possible.

SUMMARY OF THE INVENTION

It is, therefore, a primary object of the present invention to provide a focal-plane shutter for digital still cameras which allows an imaging surface to be exposed through a slit provided by the first blade and the second blade and which is favorably applied to a camera equipped with an electronic view finder and is suitable for compact design.

It is another object of the present invention to provide a focal-plane shutter for digital still cameras in which the shutter blade is actuated by a spring in photography and a motor is actuated against the biasing force of the spring in cocking operation and which offers a compact design even when the motor is mounted to the shutter unit, and can be used in relatively many kinds of cameras.

In order to achieve the above objects, according to one aspect of the present invention, the focal-plane shutter for digital still cameras includes a first blade and a second blade, each having a plurality of arms pivotally mounted on a shutter base plate and at least one blade component pivotally supported thereby; a driving member for the first blade, actuated by the biasing force of a driving spring for the first blade to open an exposure aperture through the first blade when an exposure operation is performed; a driving member for the second blade, actuated by the biasing force of a driving spring for the second blade to close the exposure aperture through the second blade when the exposure operation is performed; a retaining means for the first blade and a retaining means for the second blade, retaining the driving member for the first blade and the driving member for the second blade, respectively, at positions where the exposure operation is started, immediately before the exposure operation is started, and releasing their retaining forces at preset timing when the exposure operation is started; and a cocking member for actuating the driving member for the second blade against the biasing force of the driving spring for the second blade when moved from the initial position to the cocked position thereof, stopped once at a temporary stop position where the exposure aperture is fully opened by the second blade and then moved from this position to a cocked position in photography so that the driving member for the first blade is actuated against the biasing force of the driving spring for the first blade and after the exposure aperture is closed by the first blade, the cocking member is restored to the initial position from the cocked position before the exposure operation is started by each driving member.

In the focal-plane shutter for digital still cameras of the present invention, when the cocking member is a rotary member with a wheel, designed so that its rotation is controlled by a motor, the stop at the temporary stop position and the control of the operation start can be easily made.

In the focal-plane shutter for digital still cameras of the present invention, when the cocking member is restored to the initial position from the cocked position, the amount of movement of the cocking member can be decreased, compared with the case where the cocking member is moved in only one direction, if the cocking member is moved in a reverse direction with respect to the direction in which it is moved from the initial position to the cocked position.

In the focal-plane shutter for digital still cameras of the present invention, when each of the retaining means for the first blade and the retaining means for the second blade is constructed with an electromagnet for attracting an iron piece member provided in each of the driving member for the first blade and the driving member for the second member, the construction of the shutter becomes simple.

Furthermore, in the focal-plane shutter for digital still cameras of the present invention, when at least one sensor is provided in order to detect at least one of a closed state of the exposure aperture where the cocking member is located at the initial position, a fully opened state of the exposure aperture where the cocking member is located at the temporary stop position, and a closed state of the exposure aperture where the cocking member is located at the cocked position, each of the above positions can be checked, and it becomes possible to grasp an abnormal operation of the shutter with accuracy.

In this case, when the at least one sensor is designed to detect the moving position of the cocking member or a transmission member provided between the motor and the cocking member, the mechanism of the shutter becomes simple.

According to another aspect of the present invention, the focal-plane shutter for digital still cameras includes two base plates between which a blade chamber is provided, having object optical path apertures, one for each of the base plates, so that an exposure aperture is restricted by one or both of them; at least one opening and closing means constructed with a plurality of arms pivotally mounted on one of the two base plates within the blade chamber in a region which lies on one of right and left sides of the exposure aperture in an ordinary photographing posture and at least one blade component pivotally supported by the plurality of arms, opening and closing the exposure aperture in a vertical direction in the photographing posture; at least one driving means connected to one of the plurality of arms of the opening and closing means and attached to one of the two base plates outside the blade chamber in the region so that the opening and closing means is actuated by the biasing force of a driving spring in photography; at least one retaining means retaining the driving means at a position where an operation on the driving spring is started so that its retaining force is released in photography; at least one motor mounted to one of the two base plates so that a lengthwise direction of its rotary shaft is nearly parallel to the vertical direction at a position in the region, farther away from the exposure aperture than the position of the driving means; and at least one cocking means actuated by the motor between an initial position and a cocked position so that when it is moved from the initial position to the cocked position, the driving means is actuated against the biasing force of the driving spring, and restored to the initial position, at latest, before the driving means starts to operate in photography.

In the focal-plane shutter for digital still cameras of the present invention, when the retaining means is constructed with an electromagnet and the driving means is provided with an iron piece member attracted to the electromagnet, a direct type shutter which is simple in structure can be obtained.

In the focal-plane shutter for digital still cameras of the present invention, when two opening and closing means, two driving means, and two retaining means are provided and one motor and one cocking means are placed, a shutter for making exposure through a slit provided by the first blade and the second blade is favorably obtained.

In the focal-plane shutter for digital still cameras of the present invention, the driving means may be mounted to one of the two base plates and the motor may be mounted to the other.

In the focal-plane shutter for digital still cameras of the present invention, the driving means and the motor may be mounted to the same one of the two base plates. In this case, when the shutter is designed so that a part of the motor is directed toward a base plate to which the motor is not mounted, of the two base plates, and projects within the limit of up to the surface, on the opposite side of the blade chamber, of the base plate, is this may be advantageous for compactness of the camera.

In the focal-plane shutter for digital still cameras of the present invention, when the shutter is incorporated in the camera, the driving means and the motor are placed to lie in the proximity of or in a space provided by the grip of a camera body. By doing so, the design of the camera will not be spoiled.

These and other objects as well as the features and advantages of the present invention will become apparent from the following detailed description of the preferred embodiments when taken in conjunction with the accompanying drawings.

DETAILED DESCRIPTION OF THE PREFERRED EMBODIMENTS

In accordance with the drawings, one embodiment of the present invention will be described below.

In this embodiment, the present invention is constructed as a well-known direct type focal-plane shutter, and each of the first blade and the second blade, as often seen in a focal-plane shutter for film cameras, uses a plurality of blade components. The structure of the embodiment is first explained, chiefly using FIG. 2. In the following description, the object side of individual members is conveniently referred to as a surface side, and an image sensor (such as a CCD) side as a back side.

Figure 1:
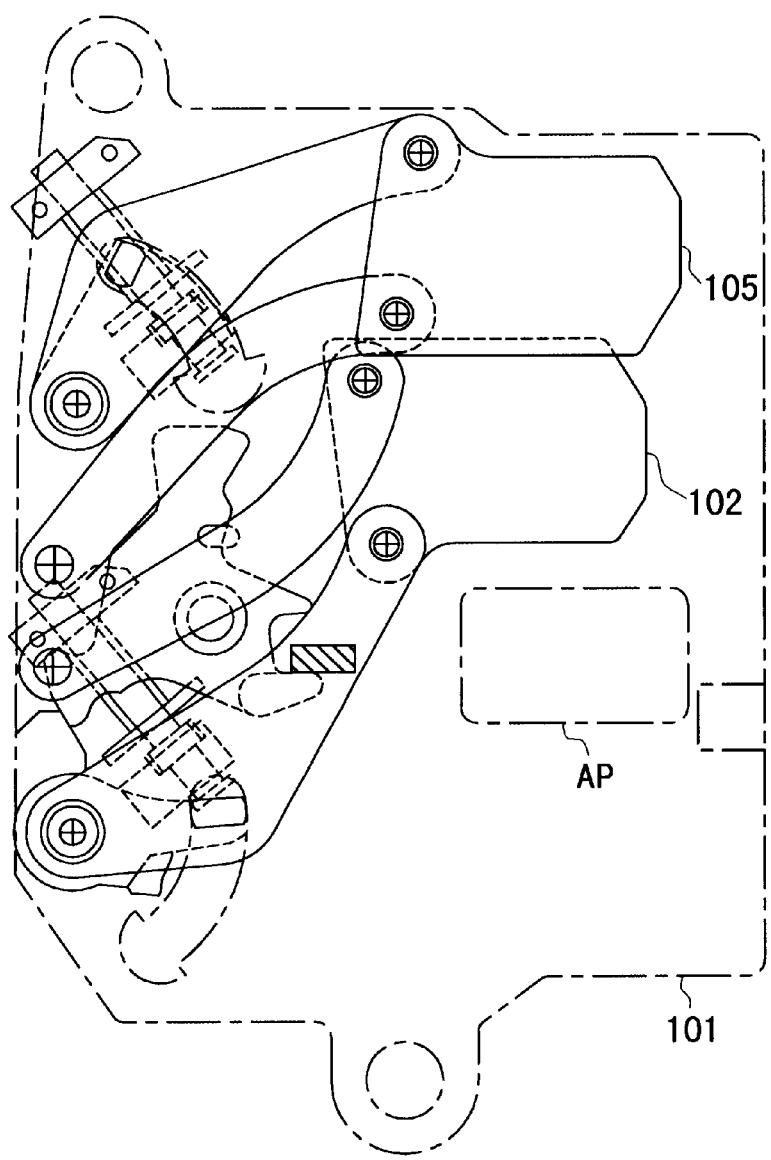
FIG. 1 is a plan view showing one conventional example of a shutter for digital cameras.
Figure 2:
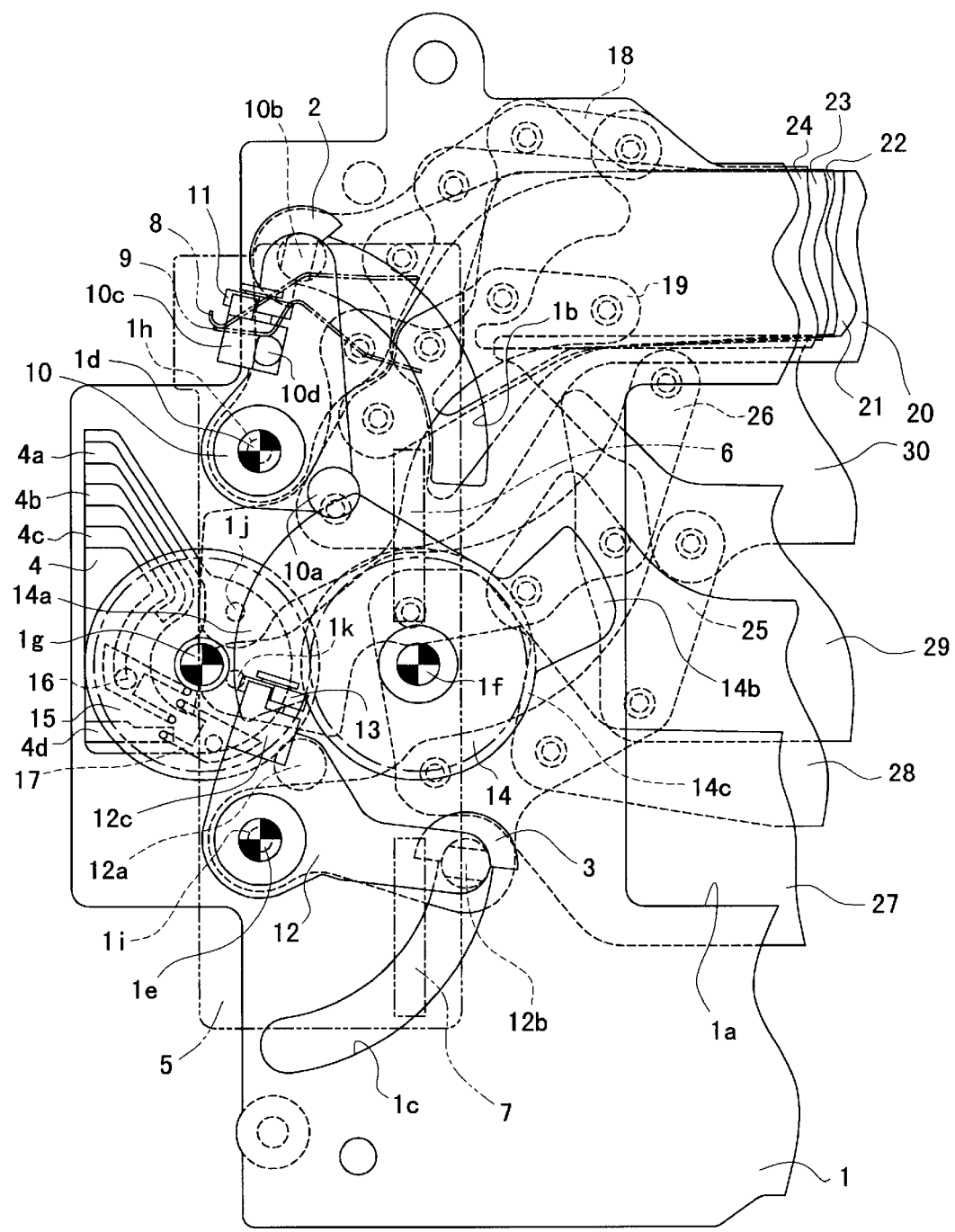
FIG. 2 is a plan view of one embodiment showing a part of the left side of a shutter, viewed from the object side, that is, the photographing lens side, in a state where a power is shut off or a state immediately after an exposure operation is completed.

A shutter base plate 1 of the embodiment is provided with an aperture 1a of a rectangle elongated in lateral direction at about the middle thereof. However, since FIG. 2 depicts only a part of the shutter on the left side thereof, viewed from the object side, the aperture 1a is also depicted with respect to only a part thereof on the left side. As is well known, an intermediate plate and an auxiliary base plate, although not shown here, are mounted, a predetermined distance apart, on the back side of the shutter base plate 1. A blade chamber for first blade components is provided between the shutter base plate 1 and the intermediate plate, and a blade chamber for second blade components is provided between the intermediate plate and the auxiliary base plate. In the intermediate plate and the auxiliary base plate, apertures similar to the aperture 1a are also provided, one for each plate, and usually these three apertures are superposed to restrict the exposure aperture as a photographing image frame. However, the embodiment is described on the premise that the configuration of the aperture 1a restricts the exposure aperture. Two arcuate slots 1b and 1c are provided on the left side of the aperture 1a. At the upper ends of these slots, shock absorbing members 2 and 3 made of butyl rubber, each having a planar shape of the letter C, are mounted in a well-known fashion. On the shutter base plate 1, a printed wiring board 4 is mounted on its surface side by a proper means. A copper foil pattern 4a as a common terminal, a copper foil pattern 4b as a terminal for a first blade cocking switch, a copper foil pattern 4c as a terminal for a second blade cocking switch, and a copper foil pattern 4d for an initial position switch are provided on the surface of the printed wiring board 4.

Furthermore, shafts 1d, 1e, 1f, and 1g are mounted on the surface side of the shutter base plate 1, and shafts 1h, 1i, 1j, and 1k are mounted on the back side. The shafts 1d and 1h are provided on the same shaft, and the shafts 1e and 1i are also provided on the same shaft. At the tops of the shafts 1d, 1e, and 1f, a supporting plate 5 in which only its contour is indicated by a two-dot chain line in FIG. 2 is mounted parallel to the shutter base plate 1. An electromagnet for the first blade and an electromagnet for the second blade are attached to the supporting plate 5 on the side of the shutter base plate 1, and only iron cores 6 and 7 corresponding to these electromagnets are indicated by two-dot chain lines in FIGS. 2 and 3. On the surface side of the supporting plate 5, a printed wiring board, not shown, is mounted, and a flash switch (an X contact) is provided thereon. In each of FIGS. 2–5, two contact segment members 8 and 9 constituting this switch are shown.

A driving member 10 for the first blade, made of synthetic resin, is rotatably mounted to the shaft 1d of the shutter base plate 1 and is biased by a well-known driving spring for the first blade, not shown, so that it is rotated in a counterclockwise direction. The driving member 10 for the first blade has a portion 10a to be pressed, a driving pin 10b, and a mounting portion 10c and is provided with a pressing portion 10d for actuating the contact segment member 9 on the surface side of the mounting portion 10c. The driving pin 10b provided on the back side has a circular cross section at its root edge and an oval cross section at its top so that the root edge is capable of abutting on the shock absorbing member 2, and the top passes through the slot 1b to project on the back side of the shutter base plate 1. The mounting portion 10c, as is well known, has an iron piece member 11 mounted through a spring, not shown, so that it can be attracted to and retained by the iron core 6 of the electromagnet for the first blade.

A driving member 12 for the second blade, made of synthetic resin, is rotatably mounted to the shaft 1e of the shutter base plate 1 and is biased by a well-known driving spring for the second blade, not shown, so that it is rotated in a counterclockwise direction. The driving member 12 for the second blade has a portion 12a to be pressed, a driving pin 12b, and a mounting portion 12c. The driving pin 12b has the same shape as the driving pin 10b so that the root edge is capable of abutting on the shock absorbing member 3, and the top passes through the slot 1c to project on the back side of the shutter base plate 1. The mounting portion 12c, as is well known, has an iron piece member 13 mounted through a spring so that it can be attracted to and retained by the iron core 7 of the electromagnet for the second blade.

A cocking member 14 made of synthetic resin is rotatably mounted to the shaft 1f of the shutter base plate 1. The cocking member 14 is provided with two pressing portions 14a and 14b, each assuming a cam shape on the periphery thereof, and has a wheel portion 14c on the back side. The two pressing portions 14a and 14b are such that the pressing portion 14a is provided closer to the shutter base plate 1 than the pressing portion 14b, and when the cocking member 14 is rotated, the pressing portion 14a presses the portion 12a to be pressed, provided on the back side of the driving member 12 for the second blade, without interfering with the driving member 10 for the first blade and the mounting portion 12c of the driving member 12 for the second blade.

A wheel 15 is rotatably mounted to the shaft 1g of the shutter base plate 1 to mesh with the wheel portion 14c of the cocking member 14. The wheel 15, made of synthetic resin, has two contact segment members 16 and 17 mounted on the back side so that the contact segment member 16 is capable of electrically connect two copper foil patterns 4a and 4b of the printed wiring board 4, while the contact segment member 17 is capable of electrically connect two copper foil patterns 4a and 4c, or 4a and 4d. The embodiment is designed so that the wheel 15 is rotated clockwise or counterclockwise by a motor, not shown.

Subsequently, a description is given of the structures of the first blade and the second blade, attached to the back side of the shutter base plate 1. In the embodiment, as mentioned already, each of the first blade and the second blade has a plurality of blade components. In such a case, each of the first blade and the second blade is usually treated as a blade group. In the description of the embodiment, therefore, the first blade and the second blade are hereinafter referred to as a first blade group and a second blade group, respectively. The first blade group is constructed with two arms 18 and 19 rotatably mounted to the shafts 1h and 1j, respectively, of the shutter base plate 1 and five blades 20, 21, 22, 23, and 24 pivotally supported in turn along the longitudinal direction of the arms. The blade 24 pivotally supported at a foremost place serves as a slit forming blade. The arm 18 of the first blade group is provided with a well-known slot, into which the driving pin 10b of the driving member 10 for the first blade is fitted.

On the other hand, the second blade group, which is exactly the same in structure as the first blade group, is placed between the intermediate plate and the auxiliary base plate which are not shown, in a state where the first blade group is reversed. The second blade group includes two arms 25 and 26 rotatably mounted to the shafts 1i and 1k, respectively, of the shutter base plate 1 and four blades 27, 28, 29, and 30 pivotally supported in turn lengthwise of the arms. The blade 30 pivotally supported at a foremost place serves as a slit forming blade. The driving pin 12b of the driving member 12 for the second blade is fitted into a well-known slot provided on the arm 25.

Subsequently, the operation of the embodiment will be described in reference to FIGS. 2–5 showing the shutter constructed as mentioned above and FIG. 6 showing a timing chart. The diagram of FIG. 2 corresponds to both a state where a camera is not used and the power is shut off and a state immediately after an exposure operation is completed. At an initial stage, however, it is assumed that the shutter is set in the former state. The focal-plane shutter of the embodiment is used in a camera which has an electronic view finder. Thus, it is natural to hold the aperture 1a fully open, except for photography. In the embodiment, however, when the power is turned off, the aperture 1a is covered with the four blades 27–30 of the second blade group so that the performance of photoelectric conversion of an image sensor is not degraded.

In FIG. 2, when the power is turned on, the contact segment member 17 comes in contact with the two copper foil patterns 4a and 4d, and thus an initial position switch is in an on condition. After the lapse of a preset time from the on condition, a motor, not shown, is turned in a normal direction, and thereby the wheel 15 is rotated clockwise. Hence, the initial position switch is immediately placed in an off condition and the cocking member 14 is rotated counterclockwise so that after the pressing portion 14a abuts on the portion 12a to be pressed of the driving member 12 for the second blade, the driving member 12 for the second blade is rotated in a clockwise direction against the biasing force of the driving spring for the second blade, not shown. As a result, since the driving pin 12b of the driving member 12 for the second blade turns the arm 25 of the second blade group in a clockwise direction, the blades 27–30 of the second blade group are moved downwardly while overlapping, and the aperture 1a is opened by the slit forming edge of the slit forming blade 30.

Figure 3:
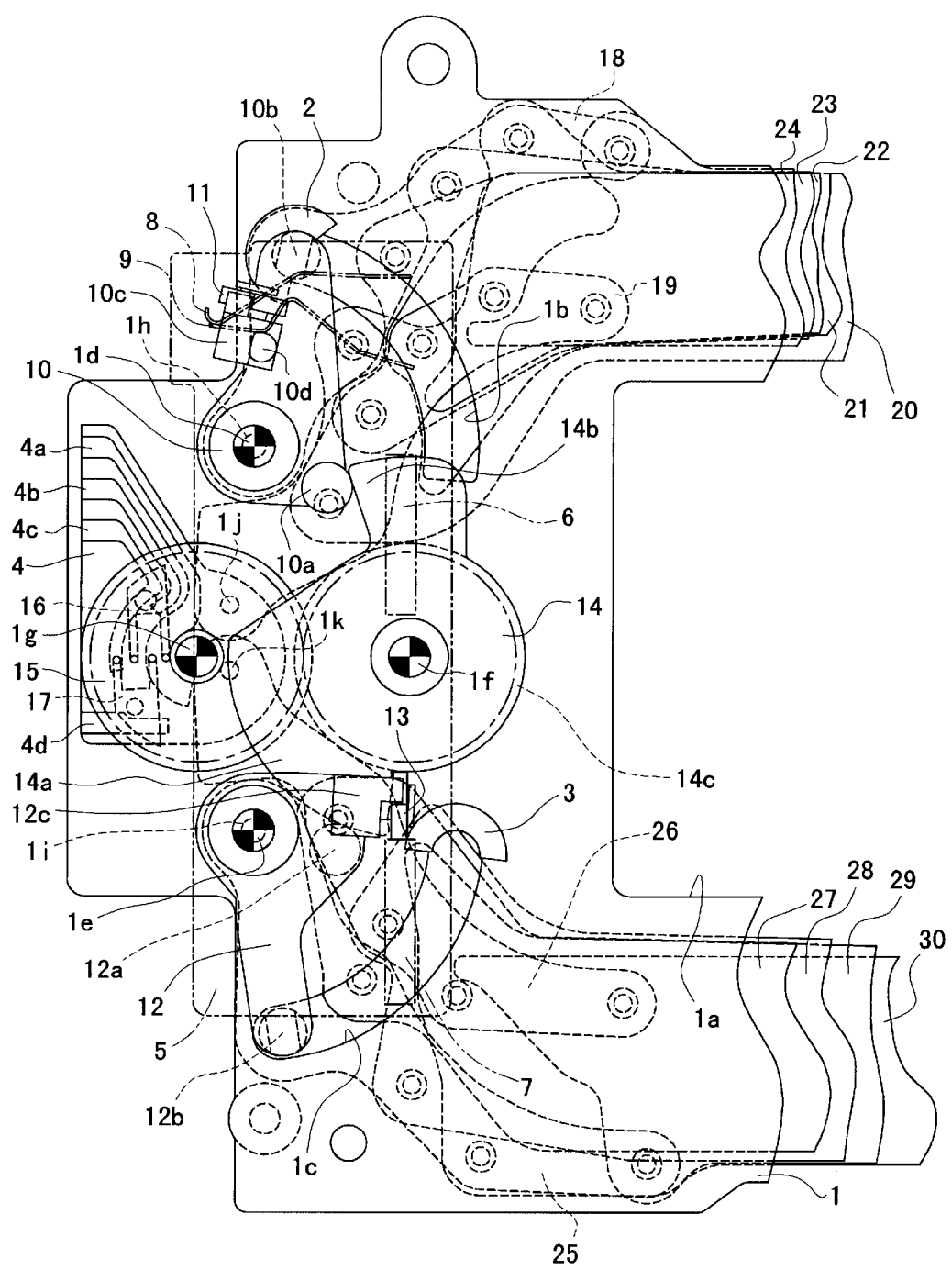
FIG. 3 is a plan view of the embodiment, viewed in the same manner as in FIG. 2, in a state where only the second blade is set from a slate of FIG. 2 so that an object can be observed through a monitor.
Figure 6:
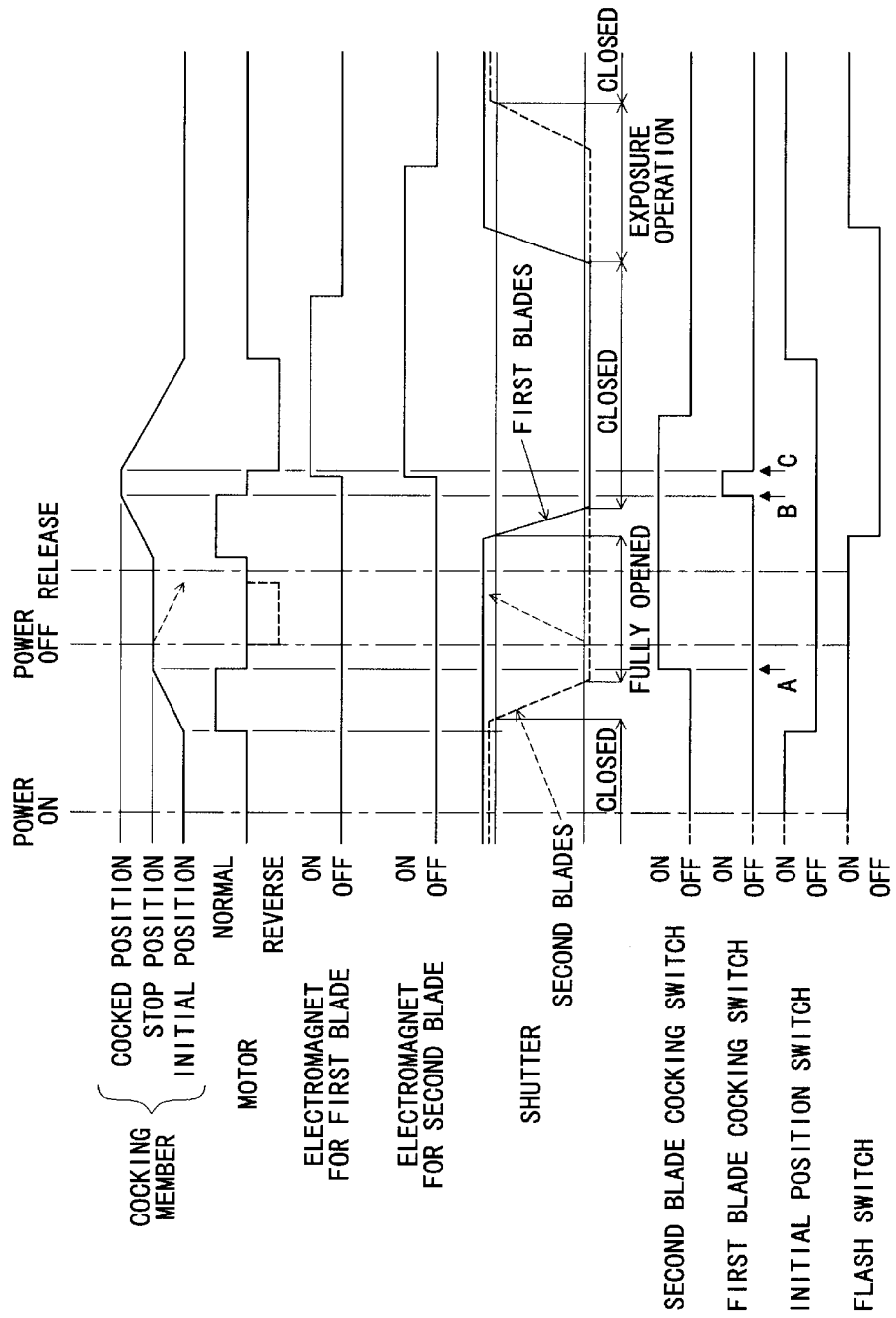
FIG. 6 is a timing chart for facilitating a comprehension of the operation of the present invention.

Immediately after the aperture 1a is fully opened, the two copper foil patterns 4a and 4c are short-circuited by the contact segment member 17 of the wheel 15 to bring the second blade cocking switch to the on condition. In FIG. 6, this point is indicated by an arrow A. When the second blade cocking switch is in the on condition, the motor drive is inactivated by a corresponding signal and the rotation of the cocking member 14 is stopped. This state is shown in FIG. 3. For the cocking member 14, however, this stop position is the temporary stop position of the cocking operation, and the pressing portion 14b does not yet begin to press the portion 10a to be pressed of the driving member 10 for the first blade. On the other hand, the driving member 12 for the second blade is such that the iron piece member 13 is brought into contact with the iron core 7 immediately before the above state is brought about, and the portion 12a to be pressed comes into contact with the peripheral surface of the pressing portion 14a of the cocking member 14. By a well-known structure of the iron piece member 13, a contact relationship between the iron core 7 and the iron piece member 13 is favorably maintained. In such a state of FIG. 3, it is possible to observe an object through a monitor.

When photographing is performed, the release button of the camera is pushed in a state of FIG. 3. In doing so, the motor is again rotated in a normal direction by a corresponding signal to turn the cocking member 14 in a counterclockwise direction. The pressing portion 14b, therefore, presses the portion 10a to be pressed of the driving member 10 for the first blade to rotate the driving member 10 for the first blade in a clockwise direction against the biasing force of the driving spring for the first blade, not shown. Consequently, since the arm 18 of the first blade group is turned clockwise by the driving pin 10b of the driving member 10 for the first blade, the blades 20–24 of the first blade group are moved downwardly while spreading, and the aperture 1a is closed by the slit forming edge of the slit forming blade 24.

During this time, the pressing portion 14a of the cocking member 14 is such that its peripheral surface merely slides over the portion 12a to be pressed of the driving member 12 for the second blade, and the driving member 12 for the second blade is not rotated. Thus, the blades 27–30 of the second blade group remains housed below the aperture 1a. In the process of rotation of the driving member 10 for the first blade, the pressing portion 10d releases the pressure of the contact segment member 9, and hence contact between the two contact segment members 8 and 9 constituting the flash switch is brought to the off condition.

Figure 4:
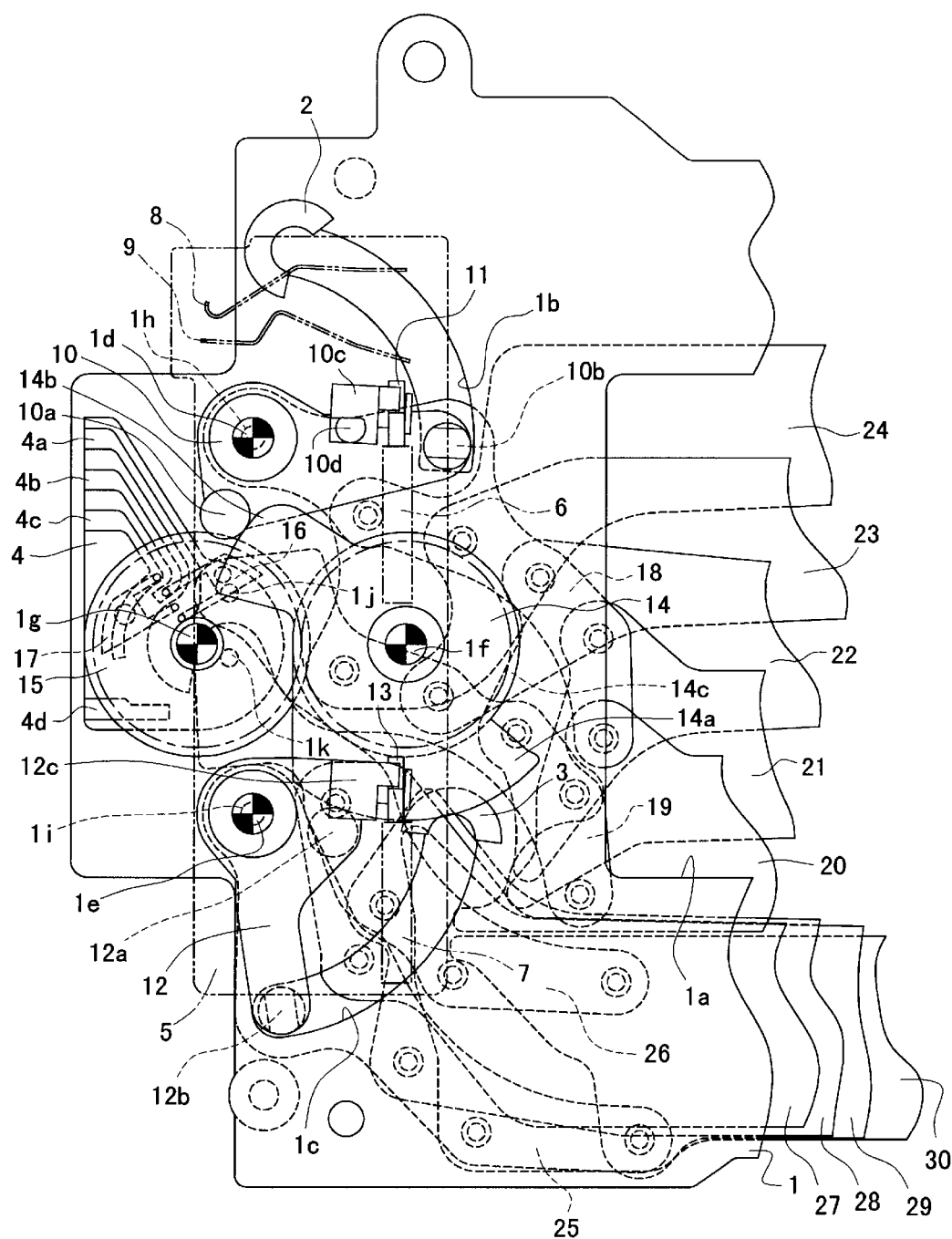
FIG. 4 is a plan view of the embodiment, viewed in the same manner as in FIG. 2, in a state where after the camera is released in a state of FIG. 3, a first blade group has been moved to a position where the exposure operation is started.

When the aperture 1a is then closed, the two copper foil patterns 4a and 4b, immediately after that, are short-circuited by the contact segment member 16 of the wheel 15 to bring the first blade cocking switch to the on condition. In FIG. 6, this point is indicated by an arrow B. When the first blade cocking switch is in the on condition, the motor drive is inactivated by a corresponding signal and the rotation of the cocking member 14 is stopped. For the cocking member 14, however, this stop position is a cocked position and a state in this case is shown in FIG. 4. The driving member 10 for the first blade is such that the iron piece member 11 is brought into contact with the iron core 6 immediately before the above state, and the portion 10a to be pressed comes into contact with the peripheral surface of the pressing portion 14b of the cocking member 14. By the well-known structure, a contact relationship between the iron core 6 and the iron piece member 11 is favorably maintained.

Figure 5:
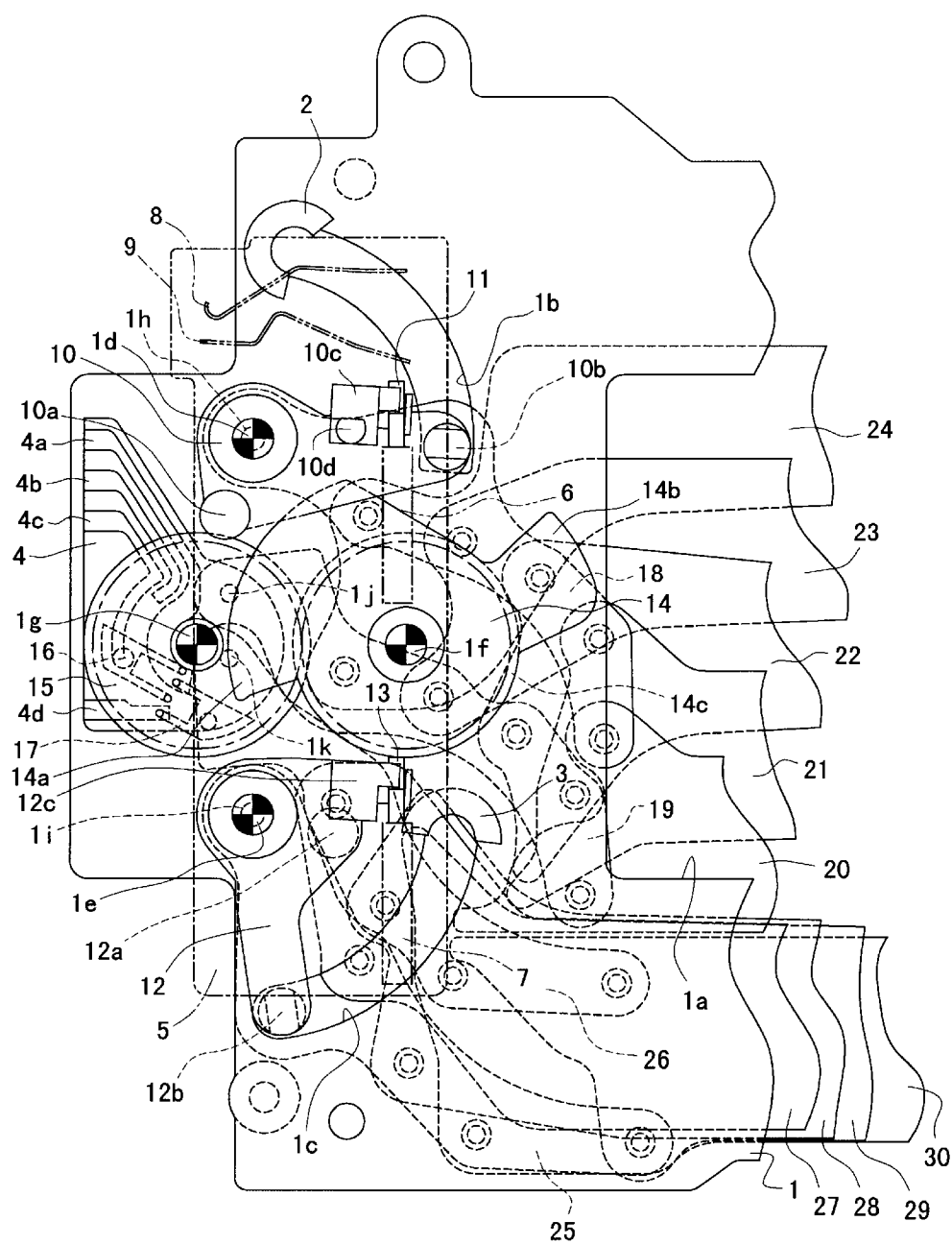
FIG. 5 is a plan view of the embodiment, viewed in the same manner as in FIG. 2, in a state where the cocking member is restored to the initial position from a state of FIG. 4, that is, immediately before the exposure operation is started.

When the first blade cocking switch is in the on condition as mentioned above, the electromagnet for the first blade and the electromagnet for the second blade are energized by a corresponding signal and the iron piece members 11 and 13 which are in contact with the iron cores 6 and 7, respectively, are attracted to and retained by them. At the same time, the operation of an exposure time control circuit is started. Furthermore, when the first blade cocking switch is in the on condition, the motor is rotated in a reverse direction from a point indicated by an arrow C after the attraction and retention of the iron piece members 11 and 13. Consequently, cocking member 14 is rotated in a clockwise direction form a state of FIG. 4 and is restored to the initial position without stopping the rotation. Its restored state is shown in FIG. 5.

In the process of the restoration of the cocking member 14 to the initial position, the pressing portion 14b is first separated from the portion 10a to be pressed of the driving member 10 for the first blade, and then the pressing portion 14a is separated from the portion 12a to be pressed of the driving member 12 for the second blade. Thus, the first blade cocking switch and the second blade cocking switch are in turn brought to the off conditions. Since the iron piece members 11 and 13 are already attracted to and retained by the iron core 6 and 7, respectively, the driving members 10 and 12 are maintained in a state of FIG. 5. This state is an exposure operation starting position for the driving members 10 and 12 and the blade groups. The rotation of the motor in a reverse direction is stopped when the initial position switch is in the on condition. In this case, it can be recognized that the initial position switch, although similar to a state of FIG. 2, is actually distinct from FIG. 2 because the flash switch is in the off condition.

After the cocking member 14 is restored to the initial position as described above, the conduction of the electromagnet for the first blade is first interrupted by the exposure time control circuit. Consequently, an attractive force for the iron piece member 11 caused by the iron core 6 is lost, and the driving member 10 for the first blade is rotated in a counterclockwise direction by the biasing force: of a stiff driving spring for the first blade, not shown. Whereby, the driving pin 10b of the driving member 10 for the first blade turns the arm 18 of the first blade group in a counterclockwise direction from a state of FIG. 5. As such, the five blades 20–24 of the first blade group are moved upwardly and the aperture 1a is opened by the slit forming edge which is the lower end of the slit forming blade 24. After that, at the stage that the aperture 1a is fully opened by the slit forming edge of the slit forming blade 24, the pressing portion 10d of the driving member 10 for the first blade brings the contact segment member 9 into contact with the contact segment member 8 to emit flashlight. Immediately after that, the driving pin 10b abuts on the shock absorbing member 2 and thereby the exposure operation on the driving member 10 for the first blade and the first blade group is completed.

After the flashlight is emitted in this way, the conduction of the electromagnet for the second blade is interrupted by the exposure time control circuit. Therefore, an attractive force for the iron piece member 13 caused by the iron core 7 is lost, and the driving member 12 for the second blade is rotated in a counterclockwise direction by the biasing force of a stiff driving spring for the second blade, not shown. Whereby, the driving pin 12b of the driving member 12 for the second blade turns the arm 25 of the second blade group in a counterclockwise direction. As such, the four blades 27–30 of the second blade group are moved upwardly and the aperture 1a is closed by the slit forming edge which is the upper end of the slit forming blade 30. When the four blades 27–30 are spread to completely close the aperture 1a, the driving pin 12b abuts on the shock absorbing member 3 and thereby the exposure operation on the driving member 12 for the second blade and the second blade group is completed.

However, the exposure operation mentioned above is limited to the case of flash photographing. As is well known, when flash photographing is not performed, it is common practice, in most cases, to interrupt the conduction of the electromagnet for the second blade before the exposure operation on the first blade group is completed. In this case, through a slit formed by two slit forming blades 24 and 30, an imaging surface is continuously exposed. A state immediately after the exposure operation is completed is shown in FIG. 2.

When the exposure operation is completed and the image information of an object to be photographed is transferred to a storage, the motor is rotated in a normal direction by a transfer completion signal. That is, as described at the beginning of the operating explanation, in the lapse of the preset time after the power is turned on and the initial position switch is set in the on condition, the same operation as the case where the motor is rotated in the normal direction is performed. As a result, the cocking member 14 is stopped at the position shown in FIG. 3 and the object can be observed again. Thus, when next photographing is performed, the exposure operation described above is carried out. However, when photographing is no longer performed and the monitor is no longer used, the power is shut off in order to minimize power consumption.

In FIG. 6, which shows the point where the power is shut off, the direction of rotation of the motor in this case is indicated by a broken line and the operations of the cocking member 14 and the second blade group are indicated by arrows of broken lines. Specifically, when the power is shut off, the motor is rotated in a reverse direction, and the cocking member 14 is rotated in a clockwise direction from a state of FIG. 3 and is restored to the initial position of FIG. 2. Consequently, the driving member 12 for the second blade is rotated in a counterclockwise direction by the biasing force of the driving spring for the second blade, not shown, because the pressing portion 14a of the cocking member 14 is separated from the portion 12a to be pressed. As such, the four blades 27–30 of the second blade group are actuated by the driving pin 12b to close the aperture 1a and is restored to a state of FIG. 2.

Also, in the above embodiment, the cocking member 14 is rotated by the motor. In the present invention, however, a driving source is not necessarily limited to the motor. Thus, the cocking member 14 is not limited to a rotating member. In the embodiment, the cocking member 14, when restored to the initial position from the cocked position, is rotated clockwise. However, it is also possible that the shapes of the two driving members 10 and 12 and the cocking member 14 are changed and thereby the cocking member 14 is rotated counterclockwise. Even though the shutter is designed in this manner, it is, of course, more advantageous that when the power is shut off and the cocking member 14 is restored to the initial position from the temporary stop position, the cocking member 14 is rotated in a clockwise direction.

Also, although in the embodiment the contact segment members 16 and 17 are attached to the wheel 15, they may be mount on the back side of the cocking member 14 so that the printed wiring board 4 is mounted on the shutter base plate 1 at a position opposite to the members 16 and 17. Moreover, a position sensor in the present invention is not limited to such a mechanical structure and may be a well-known optical sensor or magnetic sensor. Although the motor for rotating the cocking member 14 is not shown in the figures of the embodiment, it may be mounted to the shutter unit. In this case, the shutter may be designed so that the rotary shaft of the motor is located at the position of the shaft 1f or 1g and the cocking member 14 or the wheel 15 is attached to the output shaft thereof.

Focal-plane shutters for cameras are of two types. They are known as a direct type and a locking type, depending on a mechanism for retaining the driving member for the first blade and the driving member for the second blade at the position where the exposure operation is started in a state immediately before the exposure operation is started. Although the above embodiment is constructed as the direct type shutter, the present invention is not limited to the direct type shutter and is also applicable to the locking type shutter.

In accordance with the drawings, another embodiment of the present invention will be described below.

In this embodiment, the present invention is constructed as a well-known direct type focal-plane shutter, and each of the first blade and the second blade, as often seen in a focal-plane shutter for film cameras, uses a plurality of blade components. The structure of the embodiment is first explained, chiefly using FIGS. 7 and 8. In the following description, the object side of individual members is conveniently referred to as a surface side, and an image sensor (such as a CCD) side as a back side.

Figure 7:
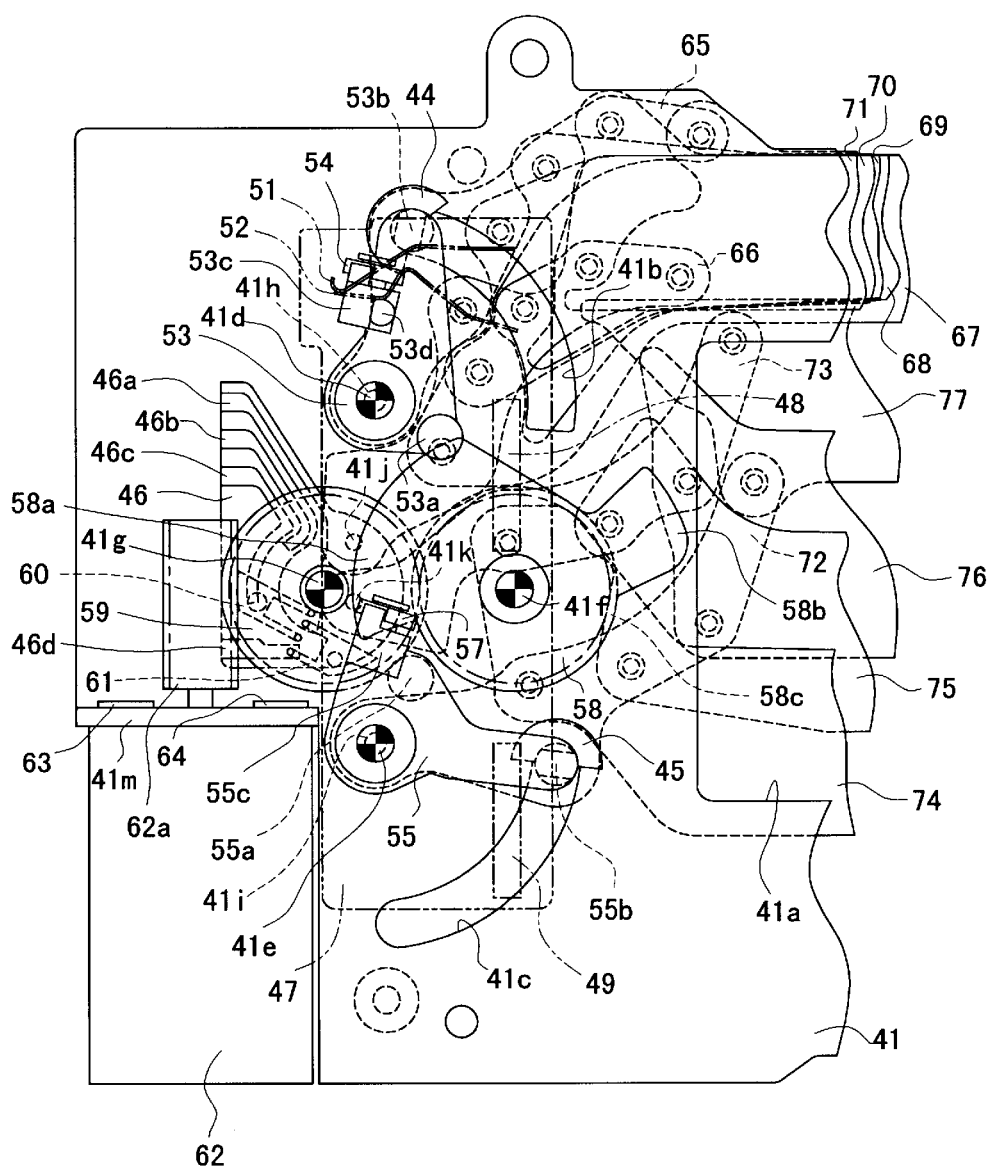
FIG. 7 is a plan view of another embodiment showing a part of the left side of a shutter, viewed from the object side, that is, the photographing lens side, in a state where a power is shut off or a state immediately after an exposure operation is completed.
Figure 8:
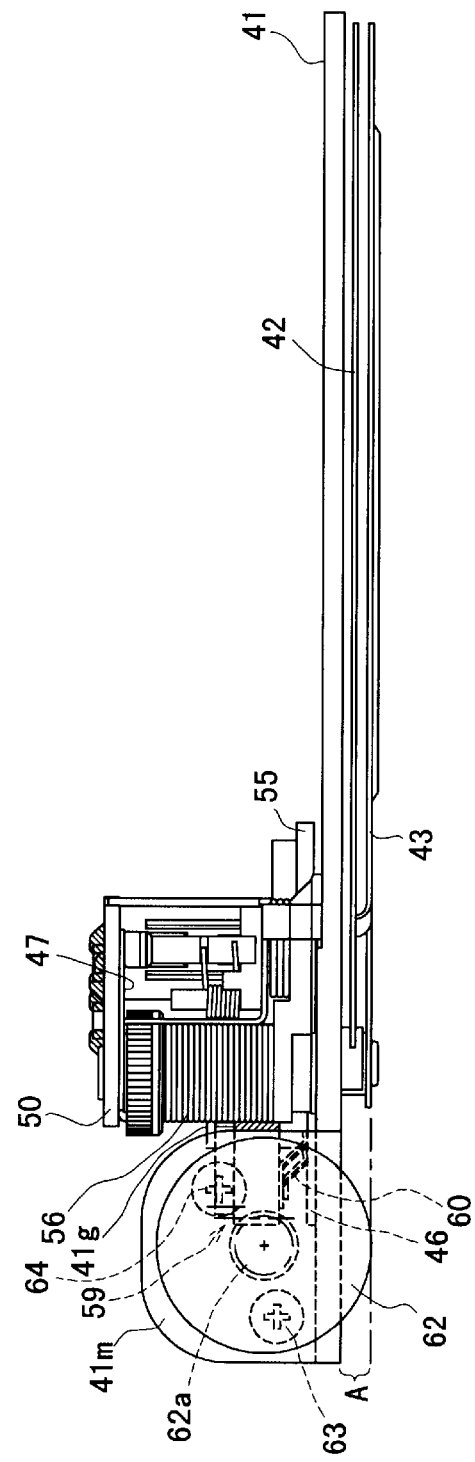
FIG. 8 is a bottom view, viewed from below the shutter of FIG. 7.

A shutter base plate 41 of the embodiment is provided with an aperture 41a of a rectangle elongated in lateral direction at about the middle thereof. However, since FIG. 7 depicts only a part of the shutter on the left side thereof, viewed from the object side, the aperture 41a is also depicted with respect to only a part thereof on the left side. As shown in FIG. 8, an intermediate plate 42 and an auxiliary base plate 43 are mounted, a predetermined distance apart, on the back side of the shutter base plate 41. A blade chamber for first blade components is provided between the shutter base plate 41 and the intermediate plate 42, and a blade chamber for second blade components is provided between the intermediate plate 42 and the auxiliary base plate 43. In the intermediate plate 42 and the auxiliary base plate 43, apertures similar to the aperture 41a are also provided, one for each plate, and usually these three apertures are superposed to restrict the exposure aperture as a photographing image frame. However, the embodiment is described on the premise that the configuration of the aperture 41 a restricts the exposure aperture.

Two arcuate slots 41b and 41c are provided on the left side of the aperture 41a. At the upper ends of these slots, shock absorbing members 44 and 45 made of butyl rubber, each having a planar shape of the letter C, are mounted in a well-known fashion. On the shutter base plate 41, a printed wiring board 46 is mounted on its surface side by a proper means. A copper foil pattern 46a as a common terminal, a copper foil pattern 46b as a terminal for a first blade cocking switch, a copper foil pattern 46c as a terminal for a second blade cocking switch, and a copper foil pattern 46d for an initial position switch are provided on the surface of the printed wiring board 46.

Furthermore, shafts 41d, 41e, 41f, and 41g are mounted on the surface side of the shutter base plate 41, and shafts 41h, 41i, 41j, and 41k are mounted on the back side. The shafts 41d and 41h are provided on the same shaft, and the shafts 41e and 41i are also provided on the same shaft. At the tops of the shafts 41d, 41e, and 41f, a supporting plate 47 in which only its contour is indicated by a two-dot chain line in FIG. 7 is mounted parallel to the shutter base plate 41. An electromagnet for the first blade and an electromagnet for the second blade are attached to the supporting plate 47 on the side of the shutter base plate 41, and only iron cores 48 and 49 corresponding to these electromagnets are indicated by two-dot chain lines in FIGS. 7 and 9–11. On the surface side of the supporting plate 47, as shown in FIG. 8, a printed wiring board 50 is mounted, and a flash switch (an X contact) is provided thereon. In each of FIGS. 7 and 9–11, two contact segment members 51 and 52 constituting this switch are shown.

A driving member 53 for the first blade, made of synthetic resin, is rotatably mounted to the shaft 41d of the shutter base plate 41 and is biased by a well-known driving spring for the first blade, not shown, so that it is rotated in a counterclockwise direction. The driving member 53 for the first blade has a portion 53a to be pressed, a driving pin 53b, and a mounting portion 53c and is provided with a pressing portion 53d for actuating the contact segment member 52 on the surface side of the mounting portion 53c. The driving pin 53b provided on the back side has a circular cross section at its root edge and an oval cross section at its top so that the root edge is capable of abutting on the shock absorbing member 44, and the top passes through the slot 41b to project on the back side of the shutter base plate 41. The mounting portion 53c, as is well known, has an iron piece member 54 mounted through a spring, not shown, so that it can be attracted to and retained by the iron core 48 of the electromagnet for the first blade.

A driving member 55 for the second blade, made of synthetic resin, is rotatably mounted to the shaft 41e of the shutter base plate 41 and is biased by a driving spring 56 for the second blade shown in FIG. 8 (the above driving spring for the first blade, not shown, is also placed in the same manner) so that it is rotated in a counterclockwise direction. The driving member 55 for the second blade has a portion 55a to be pressed, a driving pin 55b, and a mounting portion 55c. The driving pin 55b has the same shape as the driving pin 53b so that the root edge is capable of abutting on the shock absorbing member 45, and the top passes through the slot 41c to project on the back side of the shutter base plate 41. The mounting portion 55c, as is well known, like the driving member 53 for the first blade, has an iron piece member 57 mounted through a spring so that it can be attracted to and retained by the iron core 49 of the electromagnet for the second blade.

A cocking member 58 made of synthetic resin is rotatably mounted to the shaft 41f of the shutter base plate 41. The cocking member 58 is provided with two pressing portions 58a and 58b, each assuming a cam shape on the periphery thereof, and has a wheel portion 58c on the back side. The two pressing portions 58a and 58b are such that the pressing portion 58a is provided closer to the shutter base plate 41 than the pressing portion 58b, and when the cocking member 58 is rotated, the pressing portion 58a presses the portion 55a to be pressed, provided on the back side of the driving member 55 for the second blade, without interfering with the driving member 53 for the first blade and the mounting portion 55c of the driving member 55 for the second blade.

A wheel 59 made of synthetic resin is rotatably mounted to the shaft 41g of the shutter base plate 41. The wheel 59, although not clearly shown in FIG. 7, is actually constructed as a double gear, in which a gear configured on the side of the supporting plate 47 meshes with the wheel portion 58c of the cocking member 58, while a gear on the side of the shutter base plate 41 has helical teeth. Two contact segment members 60 and 61 are mounted on the back side of the wheel 59 so that the contact segment member 60 is capable of electrically connect two copper foil patterns 46a and 46b of the printed wiring board 46, while the contact segment member 61 is capable of electrically connect two copper foil patterns 46a and 46c or 46a and 46d. A motor 62 is attached to a bending portion 41m of the shutter base plate 41 by screws 63 and 64, and a worm gear 62a mounted to its output shaft meshes with the helical teeth of the wheel 59.

Subsequently, a description is given of the structures of the first blade and the second blade, attached to the back side of the shutter base plate 41. In the embodiment, each of the first blade and the second blade has a plurality of blade components. In the present invention, however, each blade may have a single blade component. The first blade is constructed with two arms 65 and 66 rotatably mounted to the shafts 41h and 41j, respectively, of the shutter base plate 41 and five blade components 67, 68, 69, 70, and 71 pivotally supported in turn along the longitudinal direction of the arms. The blade component 71 pivotally supported at a foremost place serves as a slit forming blade. The aim 65 of the first blade is provided with a well-known slot, not shown, into which the driving pin 53b of the driving member 53 for the first blade is fitted.

On the other hand, the second blade, which is exactly the same in structure as the first blade, is placed between the intermediate plate 42 and the auxiliary base plate 43 in a state where the first blade is reversed. The second blade includes two arms 72 and 73 rotatably mounted to the shafts 41i and 41k, respectively, of the shutter base plate 41 and four blade components 74, 75, 76, and 77 pivotally supported in turn lengthwise of the arms. The blade component 77 pivotally supported at a foremost place serves as a slit forming blade. The driving pin 55b of the driving member 55 for the second blade is fitted into a slot, not shown, provided on the arm 72.

Figure 9:
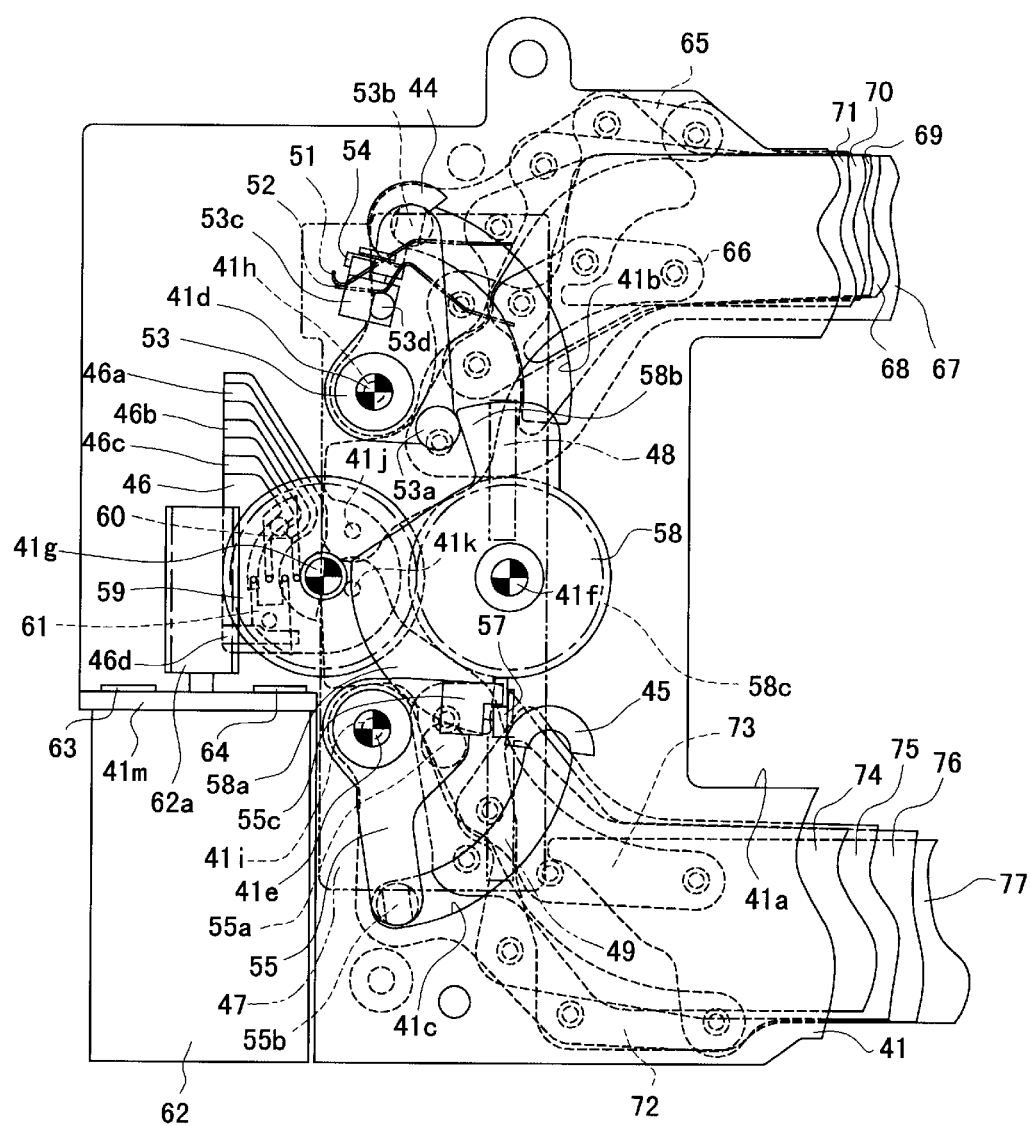
FIG. 9 is a plan view of the embodiment, viewed in the same manner as in FIG. 7, in a state where only the second blade is set from a state of FIG. 7 so that an object can be observed through a monitor.
Figure 10:
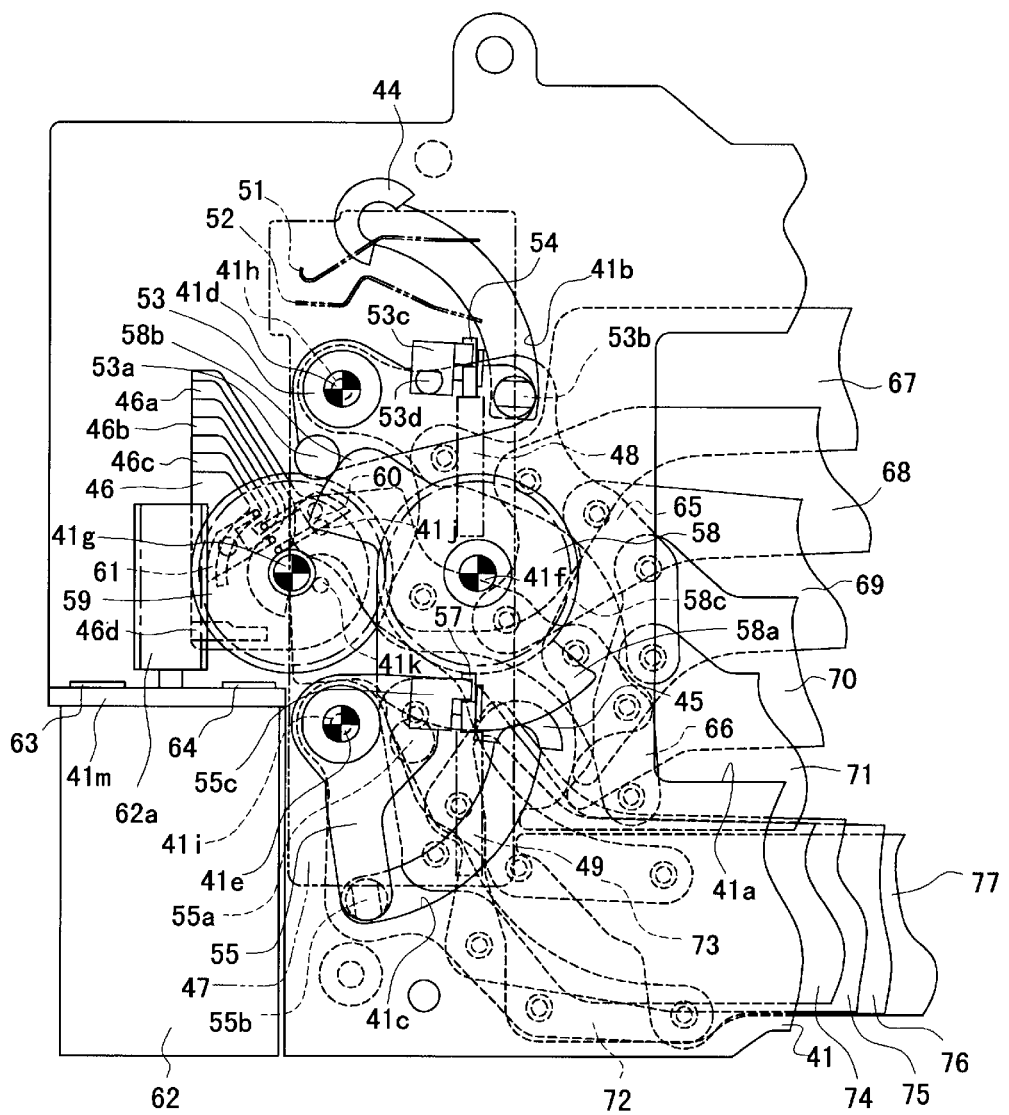
FIG. 10 is a plan view of the embodiment, viewed in the same manner as in FIG. 7, in a state where after the camera is released in a state of FIG. 9, first blade components have been moved to the cocked position.
Figure 11:
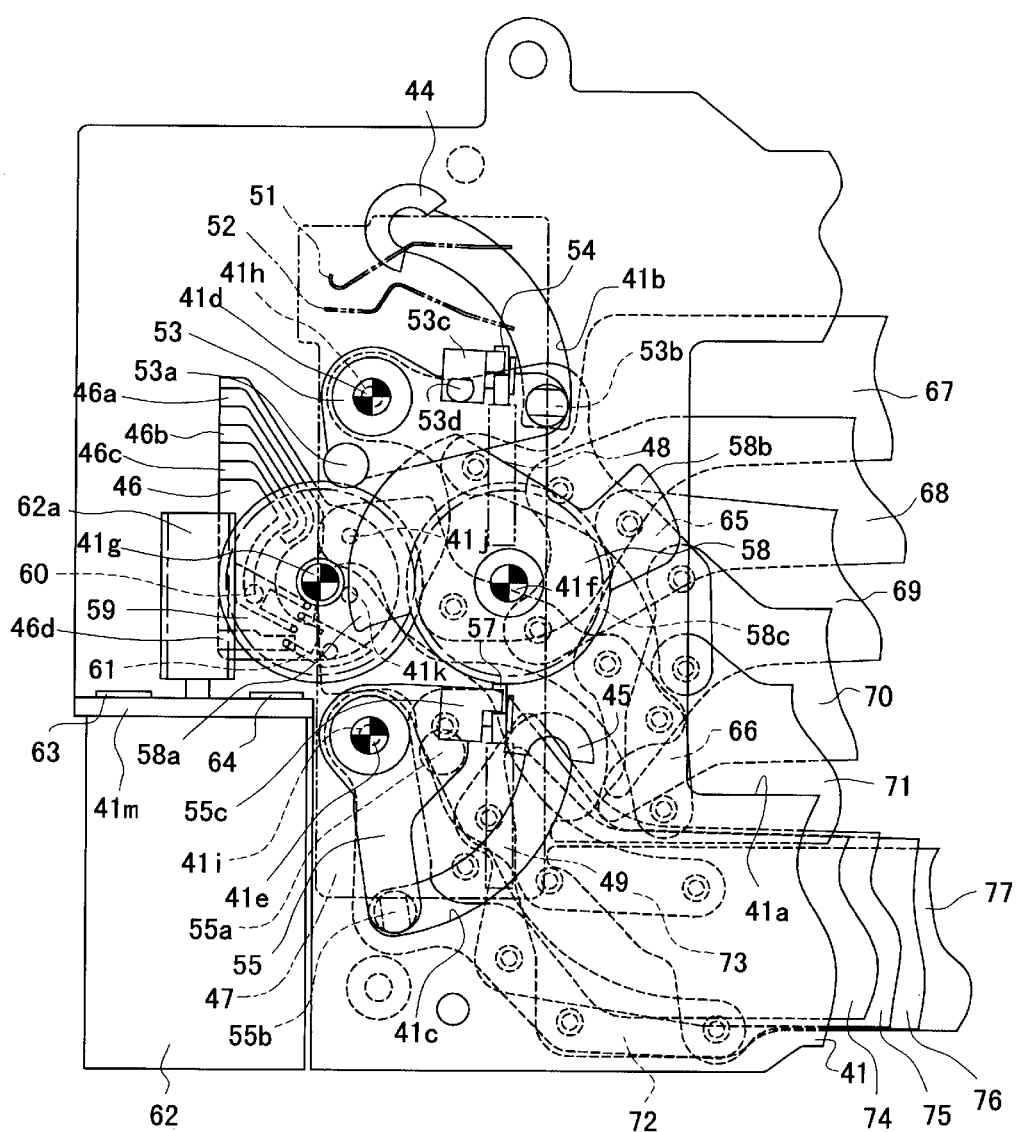
FIG. 11 is a plan view of the embodiment, viewed in the same manner as in FIG. 7, in a state where the cocking member is restored to the initial position from a state of FIG. 10, that is, immediately before the exposure operation is started.

Subsequently, the operation of the embodiment will be described in reference to FIGS. 9–11 showing the shutter constructed as mentioned above and FIG. 6 showing a timing chart. The diagram of FIG. 7 corresponds to both a state where a camera is not used and the power is shut off and a state immediately after an exposure operation is completed. At an initial stage, however, it is assumed that the shutter is set in the former state. The focal-plane shutter of the embodiment is used in a camera which has an electronic view finder. Thus, in view of the case where the power is turned on, it is favorable to hold the aperture 41a fully open, except for photography. In the embodiment, however, when the power is turned off, the aperture 41a is covered with the four blade components 74–77 of the second blade so that the performance of photoelectric conversion of an image sensor is not degraded.

In FIG. 7, when the power is turned on, the contact segment member 61 comes in contact with the two copper foil patterns 46a and 46d, and thus an initial position switch is in an on condition. After the lapse of a preset time from the on condition, the motor 62 is turned in a normal direction, and thereby the wheel 59 is rotated clockwise. Hence, the initial position switch is immediately placed in an off condition and the cocking member 58 is rotated counterclockwise so that after the pressing portion 58a abuts on the portion 55a to be pressed of the driving member 55 for the second blade, the driving member 55 for the second blade is rotated in a clockwise direction against the biasing force of the driving spring 56 for the second blade. As a result, since the driving pin 55b of the driving member 55 for the second blade turns the arm 72 of the second blade in a clockwise direction, the four blade components 74–77 of the second blade are moved downwardly while overlapping, and the aperture 41a is opened by the slit forming edge of the slit forming blade component 77.

Immediately after the aperture 41a is fully opened, the two copper foil patterns 46a and 46c are short-circuited by the contact segment member 61 of the wheel 59 to bring the second blade cocking switch to the on condition. In FIG. 6, this point is indicated by the arrow A. When the second blade cocking switch is in the on condition, the motor 62 is inactivated by a corresponding signal and the rotation of the cocking member 58 is stopped. This state is shown in FIG. 9. For the cocking member 58, however, this stop position is the temporary stop position of the cocking operation, and the pressing portion 58b does not yet begin to press the portion 53a to be pressed of the driving member 53 for the first blade.

On the other hand, the driving member 55 for the second blade is such that the iron piece member 57 is brought into contact with the iron core 49 immediately before the above state is brought about, and the portion 55a to be pressed comes into contact with the peripheral surface of the pressing portion 58a of the cocking member 58. By a well-known structure of the iron piece member 57, a contact relationship between the iron core 49 and the iron piece member 57 is favorably maintained. In such a state of FIG. 9, it is possible to observe an object through a monitor (the electronic view finder). Also, in the embodiment, when the power is turned on as mentioned above, the flash switch (that is, the contact segment members 51 and 52) is in the on condition, and the on or off condition of this switch is recognized only in an exposure operation to be described later.

When photographing is performed, the release button of the camera is pushed in a state of FIG. 9. In doing so, the motor 62 is again rotated in a normal direction by a corresponding signal to turn the cocking member 58 in a counterclockwise direction. The pressing portion 58b, therefore, presses the portion 53a to be pressed of the driving member 53 for the first blade to rotate the driving member 53 for the first blade in a clockwise direction against the biasing force of the driving spring for the first blade, not shown. Consequently, since the arm 65 of the first blade is turned clockwise by the driving pin 53b of the driving member 53 for the first blade, the five blade components 67–71 of the first blade are moved downwardly while spreading, and the aperture 41a is closed by the slit forming edge of the slit forming blade 71.

During this time, the pressing portion 58a of the cocking member 58 is such that its peripheral surface merely slides over the portion 55a to be pressed of the driving member 55 for the second blade, and the driving member 55 for the second blade is not rotated. Thus, the four blade components 74–77 of the second blade remains housed below the aperture 41a. In the process of rotation of the driving member 53 for the first blade, the pressing portion 53d releases the pressure of the contact segment member 52, and hence contact between the two contact segment members 51 and 52 constituting the flash switch is brought to the off condition.

When the aperture 41a is then closed, the two copper foil patterns 46a and 46b, immediately after that, are short-circuited by the contact segment member 60 of the wheel 59 to bring the first blade cocking switch to the on condition. In FIG. 6, this point is indicated by the arrow B. When the first blade cocking switch is in the on condition, the motor 62 is inactivated by a corresponding signal and the rotation of the cocking member 58 is stopped. For the cocking member 58, however, this stop position is a cocked position and a state in this case is shown in FIG. 10. The driving member 53 for the first blade is such that the iron piece member 54 is brought into contact with the iron core 48 immediately before the above state, and the portion 53a to be pressed comes into contact with the peripheral surface of the pressing portion 58b of the cocking member 58. By the well-known structure, as in the case of the driving member 55 for the second blade, a contact relationship between the iron core 48 and the iron piece member 54 is favorably maintained.

When the first blade cocking switch is in the on condition as mentioned above, the electromagnet for the first blade and the electromagnet for the second blade are energized by a corresponding signal and the iron piece members 54 and 57 which are in contact with the iron cores 48 and 49, respectively, are attracted to and retained by them. At the same time, the operation of an exposure time control circuit is started. Furthermore, when the first blade cocking switch is in the on condition, the motor 62 is rotated in a reverse direction from a point indicated by the arrow C after the attraction and retention of the iron piece members 54 and 57. Consequently, cocking member 58 is rotated in a clockwise direction form a state of FIG. 10 and is restored to the initial position without stopping the rotation. Its restored state is shown in FIG. 11.

In the process of the restoration of the cocking member 58 to the initial position, the pressing portion 58b is first separated from the portion 53a to be pressed of the driving member 53 for the first blade, and then the pressing portion 58a is separated from the portion 55a to be pressed of the driving member 55 for the second blade. Thus, the first blade cocking switch and the second blade cocking switch are in turn brought to the off conditions. Since the iron piece members 54 and 57 are already attracted to and retained by the iron core 48 and 49, respectively, the driving members 53 and 55 are maintained in a state of FIG. 11. This state is an exposure operation starting position for the driving members 53 and 55 and the first and second blades. The rotation of the motor 62 in a reverse direction is stopped when the initial position switch is in the on condition. In this case, it can be recognized that the initial position switch, although similar to a state of FIG. 7, is actually distinct from FIG. 7 because the flash switch is in the off condition.

After the cocking member 58 is restored to the initial position as described above, the conduction of the electromagnet for the first blade is first interrupted by the exposure time control circuit. Consequently, an attractive force for the iron piece member 54 caused by the iron core 48 is lost, and the driving member 53 for the first blade is rotated in a counterclockwise direction by the biasing force of a stiff driving spring for the first blade, not shown. Whereby, the driving pin 53b of the driving member 53 for the first blade turns the arm 65 of the first blade in a counterclockwise direction from a state of FIG. 11. As such, the five blade components 67–71 of the first blade are moved upwardly and the aperture 41a is opened by the slit forming edge which is the lower end of the slit forming blade component 71. After that, at the stage that the aperture 41a is fully opened by the slit forming edge of the slit forming blade component 71, the pressing portion 53d of the driving member 53 for the first blade brings the contact segment member 52 into contact with the contact segment member 51 to emit flashlight. Immediately after that, the driving pin 53b abuts on the shock absorbing member 44 and thereby the exposure operation on the driving member 53 for the first blade and the first blade is completed.

After the flashlight is emitted in this way, the conduction of the electromagnet for the second blade is interrupted by the exposure time control circuit. Therefore, an attractive force for the iron piece member 57 caused by the iron core 49 is lost, and the driving member 55 for the second blade is rotated in a counterclockwise direction by the biasing force of the stiff driving spring 56 for the second blade (FIG. 8). Whereby, the driving pin 55b of the driving member 55 for the second blade turns the arm 72 of the second blade in a counterclockwise direction. As such, the four blade components 74–77 of the second blade are moved upwardly and the aperture 41a is closed by the slit forming edge which is the upper end of the slit forming blade component 77. When the four blade components 74–77 are spread to completely close the aperture 41a, the driving pin 55b abuts on the shock absorbing member 45 and thereby the exposure operation on the driving member 55 for the second blade and the second blade is completed.

However, the exposure operation mentioned above is limited to the case of flash photographing. As is well known, when flash photographing is not performed, it is common practice, in most cases, to interrupt the conduction of the electromagnet for the second blade before the exposure operation on the first blade is completed. In this case, through a slit formed by two slit forming blades 71 and 77, an imaging surface is continuously exposed. A state immediately after the exposure operation is completed is shown in FIG. 7.

When the exposure operation is completed and the image information of an object to be photographed is transferred to a storage, the motor 62 is rotated in a normal direction by a transfer completion signal. That is, as described at the beginning of the operating explanation, in the lapse of the preset time after the power is turned on and the initial position switch is set in the on condition, the same operation as the case where the motor 62 is rotated in the normal direction is performed. As a result, the cocking member 58 is stopped at the position shown in FIG. 9 and the object can be observed again. Thus, when next photographing is performed, the exposure operation described above is carried out. However, when photographing is no longer performed and the monitor (the electronic view finder) is no longer used, the power is shut off in order to minimize power consumption.

The point where the power is shut off is shown in FIG. 6, and after that, the motor 62 is supplied with an electric current by a preset time. Thus, in FIG. 6, the direction of rotation of the motor 62 in this case is indicated by the broken line and the operations of the cocking member 58 and the second blade are indicated by the arrows of broken lines. Specifically, when the power is shut off, the motor 62 is rotated in a reverse direction, and the cocking member 58 is rotated in a clockwise direction from a state of FIG. 9 and is restored to the initial position of FIG. 7. Consequently, the driving member 55 for the second blade is rotated in a counterclockwise direction by the biasing force of the driving spring 56 for the second blade (FIG. 8) because the pressing portion 58a of the cocking member 58 is separated from the portion 55a to be pressed. As such, the four blades 74–77 of the second blade are actuated by the driving pin 55b to close the aperture 41a and is restored to a state of FIG. 7.

In the embodiment, the cocking member 58, when restored to the initial position from the cocked position, is rotated clockwise. However, it is also possible that the shapes of the two driving members 53 and 55 and the cocking member 58 are changed and thereby the cocking member 58 is rotated counterclockwise. Even though the shutter is designed in this manner, it is, of course, more advantageous that when the power is shut off and the cocking member 58 is restored to the initial position from the temporary stop position, the cocking member 58 is rotated in a clockwise direction. Also, although in the embodiment the contact segment members 60 and 61 are attached to the wheel 59, they may be mount on the back side of the cocking member 58 so that the printed wiring board 46 is mounted on the shutter base plate 41 at a position opposite to the members 60 and 61. Moreover, instead of such a mechanical sensor, a well-known optical sensor or magnetic sensor may be used.

Subsequently, an arrangement example where the focal-plane shutter described above is incorporated in a camera will be explained with reference to FIG. 12. A photographing lens 82 is placed in front of a camera body 81, and a grip 81a is provided on the left side of the photographing lens 82 (on the right-hand side when a photographer holds the camera). In the camera body 81, a mirror box 83, a shutter unit 84, and a solid-state image sensor 85 are arranged in this order at the back of the photographing lens 82. Between a shutter control 84a of the shutter unit 84 and the mirror box 83, stop control unit 86 is interposed. Inside the grip 81a, a cell chamber 87 is provided in front of a motor mounting portion 84b of the shutter unit 84.

Figure 12:
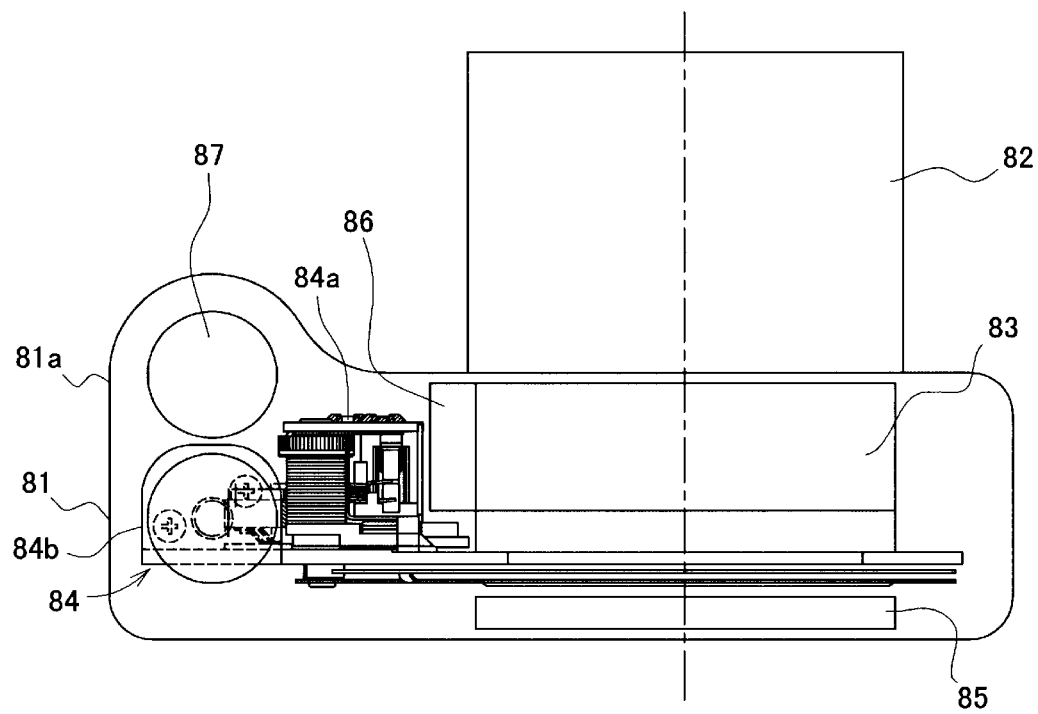
FIG. 12 is a view for explaining an arrangement, viewed from the bottom side when the shutter of the embodiment is incorporated in a camera.

As seen from FIG. 12, in order to grip the camera body 81 surely with the right hand of the photographer, the grip 81a is provided on the left side of the camera body 81 to have the cell chamber 87 therein. In the camera of such a contour design, the shutter unit 84 of the above embodiment is constructed so that the motor mounting portion 84b is located at the back of the cell chamber 87 and thereby can be favorably placed. If an arrangement is made such that the motor mounting portion 84b is situated in front of the shutter control 84a, the shutter unit will cease to be applicable to the camera using the above contour design. Alternatively, if the motor mounting portion 84b and the cell chamber 87 are replaced with each other, such a shutter unit will completely lose versatility.

When the shutter unit 84 is constructed as in the embodiment, the grip 81a does not project in front of the camera body 81. Thus, when the contour design of the camera body 81 is made nearly cubic, it is only necessary to provide the cell chamber 87 on the right side of the mirror box 83 in FIG. 12. When the camera is designed so that the grip 81a projects only on the back side of the camera body 81, the cell chamber 87 may be located at the back of the motor mounting portion 84b or, as mentioned above, may be placed on the right side of the mirror box 83. In this way, the shutter unit 84 of the above embodiment is applicable to the digital cameras of various contour designs.

In the above embodiment, as shown in FIG. 8, a part of the motor 62 projects into the region of the auxiliary base plate 43 to secure a desired space of the cell chamber 87. When the limit of the amount of projection A is set up to the surface, on the opposite side of the blade chamber, of the auxiliary base plate 43, the number of degrees of design freedom of the camera is not virtually limited. Also, although it is described above that the cell chamber 87 is provided in the grip 81a, various electrical parts, in addition to the cell chamber 87, may be placed. Alternatively, the cell chamber 87 is not provided, and only various electrical parts such as storage media may, of course, be placed.

In the embodiment, the motor 62 is mounted on the object side of the shutter base plate 41, but in the present invention, it may be mounted on the opposite side. When the auxiliary base plate 43 is designed so that a predetermined strength is obtained, the motor 62 may be mounted to the auxiliary base plate 43 as in the shutter base plate 41. In the case of the shutter unit 84 mentioned above, the shutter control 84a including the driving members 53 and 55 and the motor mounting portion 84b are arranged toward the object side in the camera, but they may be directed toward the photographer.

Since the above embodiment has the first blade and the second blade, the two driving members are provided so that they are actuated by one cocking member and one motor in the cocking operation. However, the present invention is not limited to such a structure, and the two driving members may be actuated by two cocking members and one motor or the two cocking members may be actuated by separate motors. However, when the shutter blade, unlike the embodiment, has only a single blade component, that is, when the shutter is provided with only one driving member, it is needless to say that one cocking member and one motor are provided. Focal-plane shutters for cameras are of two types. They are known as a direct type and a locking type, depending on a mechanism for retaining the driving member for the first blade and the driving member for the second blade at the position where the exposure operation is started in a state immediately before the exposure operation is started. Although the above embodiment is constructed as the direct type shutter, the present invention is not limited to the direct type shutter and is also applicable to the locking type shutter.

As mentioned above, the present invention provides the focal-plane shutter for digital still cameras, having the electronic view finder in which the imaging surface is exposed through the slit provided by the first blade and the second blade. Nevertheless, the present invention excels in that the amount of operation of each of the first blade and the second blade is minimized and a small-sized focal-plane shutter can be constructed, as compared with the conventional focal-plane shutter. Furthermore, since there is no need to considerably change or complicate the structure of the ordinary focal-plane shutter, the present invention is very advantageous for manufacture.

The focal-plane shutter is constructed so that the driving means actuating the opening and closing means by the biasing force of the driving spring in photographing is actuated by the motor against the biasing force of the driving spring in the cocking operation. In this case, the motor is mounted to the shutter unit in such a way that the lengthwise direction of its rotary shaft is nearly parallel to the opening and closing direction of the exposure aperture, on the opposite side of the exposure aperture with respect to the driving means. Consequently, the present invention has exceptional versatility that the shutter is applicable to various digital cameras of different contour designs.

What is claimed is:

1. A focal-plane shutter for digital still cameras, comprising:

a first blade and a second blade, each having a plurality of arms pivotally mounted on a shutter base plate and at least one blade component pivotally supported thereby;

a first-blade driving member constructed and arranged to be actuated by a biasing force of a first-blade driving spring to open an exposure aperture through said first blade in an exposure operation;

a second-blade driving member constructed and arranged to be actuated by a biasing force of a second-blade driving spring to close said exposure aperture through said second blade in the exposure operation;

a first-blade retaining member and a second-blade retaining member, constructed and arranged to retain, immediately before a start of the exposure operation, said first-blade driving member and said second-blade driving member at positions where to start the exposure operation and to release, upon the start of the exposure operation, retaining forces of said first-blade driving member and said second-blade driving member respectively, at a preset timing; and a cocking member having a first pressing portion and a second pressing portion, wherein, in a movement from an initial position toward a cocked position, said cocking member actuates, via said second pressing portion, said second-blade driving member against said biasing force of said second-blade driving spring to open said exposure aperture by said second blade while said first blade is kept withdrawn from said exposure aperture by said biasing force of said first-blade driving spring, said cocking member is stopped once at a temporary stop position where said exposure aperture is opened by said second blade, and said cocking member is then moved, in photographing, from said temporary stop position to said cocked position so that said first-blade driving member is actuated by said first pressing portion to close said exposure aperture via said first blade against said biasing force of said first-blade driving spring while said second blade is kept withdrawn from said exposure aperture by the second pressing member, and after said exposure aperture is closed by said first blade, said cocking member is restored to said initial position from said cocked position before the start of the exposure operation by said first-blade driving member and said second-blade driving member.

2. A focal-plane shutter for digital still cameras according to claim 1, wherein said cocking member is a rotary member with a wheel, constructed so that a rotation thereof is controlled by a motor.

3. A focal-plane shutter for digital still cameras according to claim 1, wherein when said cocking member is restored to said initial position from said cocked position, said cocking member is actuated in a reverse direction with respect to a direction in which said cocking member is moved from said initial position to said cocked position.

4. A focal-plane shutter for digital still cameras according to claim 1, wherein each of said first-blade retaining member and said second-blade retaining member is an electromagnet configured to attract an iron piece member provided in each of said first-blade driving member and said second-blade driving member.

5. A focal-plane shutter for digital still cameras according to claim 1, further comprising at least one sensor, wherein said at least one sensor is configured to detect at least one of a closed state of said exposure aperture where said cocking member is located at the initial position, an opened state of said exposure aperture where said cocking member is located at said temporary stop position, and a closed state of said exposure aperture where said cocking member is located at said cocked position.

6. A focal-plane shutter for digital still cameras according to claim 5, wherein said at least one sensor detects a moving position of said cocking member or a transmission member provided between said motor and said cocking member.

7. A focal-plane shutter for digital still cameras, comprising:

two base plates having a blade chamber therebetween, said base plates having object optical path apertures, one for each of said base plates, so that an exposure aperture is determined by one or both of said object optical path apertures;

at least one opening and closing device constructed with a plurality of arms pivotally mounted on one of said two base plates within said blade chamber in one of lateral regions in reference to said exposure aperture and at least one blade component pivotally supported by said plurality of arms, to open and close said exposure aperture;

at least one driving member connected with one of said plurality of arms of said opening and closing device and attached to one of said two base plates outside said blade chamber in said one of the lateral regions, to actuate, in photographing, said opening and closing device by a biasing force of a driving spring;

at least one retaining member constructed and arranged to retain said driving member at a position where to start an operation by said driving spring, to release retaining force thereof in photographing;

at least one motor mounted to one of said two base plates; and at least one cocking member actuated by said motor between an initial position and a cocked position so that said cocking member actuates, in a movement from said initial position to said cocked position, said driving member against said biasing force of said driving spring, and is restored to said initial position, at latest, before said driving member starts to operate in photographing, wherein said motor is mounted on the base plate at a position that is in said one of the lateral regions and that is farther away from said exposure aperture than said driving member, said motor is mounted such that a lengthwise direction of a rotary shaft thereof is substantially parallel with a direction of opening and closing operation of said blade component, and wherein at least a part of a housing of said motor projects toward a remaining base plate, on which said motor is unmounted, up to a level of a surface, on an opposite side of said blade chamber, of said remaining base plate.

8. A focal-plane shutter for digital still cameras according to claim 7, wherein said retaining member is an electromagnet and said driving member is provided with an iron piece member attracted to said electromagnet.

9. A focal-plane shutter for digital still cameras according to claim 7, wherein two opening and closing devices, two driving members, and two retaining members are provided, and one motor and one cocking member are provided.

10. A focal-plane shutter for digital still cameras according to claim 7, wherein said driving member is mounted on one of said two base plates, and said motor is mounted on a remaining base plate.

11. A focal-plane shutter for digital still cameras according to claim 7, wherein said driving member and said motor are mounted on one of said two base plates.

12. A focal-plane shutter for digital still cameras according to claim 7, wherein when said shutter is incorporated in a camera, said driving member and said motor are placed to lie in the proximity of or in a space provided by a grip of a camera body.

* * * * *